United States Patent
Parker

(10) Patent No.: US 6,723,150 B2
(45) Date of Patent: Apr. 20, 2004

(54) AIR FILTER WITH EXPANDABLE FILTER MEDIA

(75) Inventor: Nathan P. Parker, Flint, TX (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 10/090,058

(22) Filed: Feb. 28, 2002

(65) Prior Publication Data

US 2003/0159415 A1 Aug. 28, 2003

(51) Int. Cl.[7] .............................................. B01D 46/52
(52) U.S. Cl. ........................ 55/521; 55/490; 55/493; 55/497; 55/495; 55/503; 55/510; 55/511; 55/DIG. 31
(58) Field of Search ..................... 55/490, 493, 495, 55/497, 503, 510, 511, 521, DIG. 31

(56) References Cited

U.S. PATENT DOCUMENTS

| | | |
|---|---|---|
| 1,982,639 A | 12/1934 | Christofferson |
| 2,393,419 A | 1/1946 | Schaaf |
| 2,739,667 A | 3/1956 | Palmore |
| 3,246,456 A | 4/1966 | Sharp |
| 3,630,008 A | 12/1971 | Revell et al. |
| 4,885,015 A * | 12/1989 | Goulet et al. .................. 55/497 |
| 5,273,564 A * | 12/1993 | Hill .............................. 55/493 |
| 5,531,892 A * | 7/1996 | Duffy .......................... 55/497 |
| 5,665,145 A | 9/1997 | Goodman et al. |
| 6,066,194 A | 5/2000 | Hugghins et al. |
| 6,319,300 B1 * | 11/2001 | Chen ............................ 55/497 |
| 6,454,826 B2 * | 9/2002 | Fath et al. .................... 55/497 |
| 6,485,538 B1 * | 11/2002 | Toyoshima ................... 55/497 |

* cited by examiner

Primary Examiner—Minh-Chau T. Pham
(74) Attorney, Agent, or Firm—William J. Beres; William O'Driscoll

(57) ABSTRACT

An air filter assembly comprises a plastic frame containing an air permeable filter media. The media is corrugated to provide a series of pleats. Some of the pleats can be folded more compactly than others, so that the media can fit in various size frames. This can reduce the inventory of filter manufacturers and dealers. The filter frame can be plastic injection molded with integral living hinges to enable the frame to fold from a relatively flat shape to a more box-like structure. The frame includes one or more flip-up saw tooth racks that help define a main series of chambers plus a storage chamber. The main series of chambers supports a portion of the media that is more loosely folded for filtering air. The storage chamber is adjacent the main air stream and holds the more compactly folded, excess pleats.

35 Claims, 5 Drawing Sheets

AIR FILTER WITH EXPANDABLE FILTER MEDIA

BACKGROUND OF THE INVENTION

1. Field of the Invention

The present invention generally relates to heating, ventilating, and air conditioning systems (HVAC systems), and more specifically to a filter core having an expandable air filter media.

2. Description of Related Art

HVAC equipment, such as furnaces, air conditioners, heat pumps and air handlers, usually include some type of air filter for removing dust and other particles from the air. A blower typically forces the air through the filter before the air is conveyed to a room or other area of a building served by the HVAC equipment.

One type of filter, known as a filter core, comprises an outer frame containing an air permeable material or filter media. The core then is removably inserted in a filter casing that holds the filter core in the main air passage of the HVAC equipment or associated ductwork. Restricted porosity of the filter media allows the filter to catch air contaminants as air passes through the filter. As the filter becomes dirty, the filter core and/or filter media is periodically cleaned or replaced.

One example of a filter casing for holding filter cores is disclosed in U.S. Pat. No. 3,630,008. The casing includes hinged side panels that provide access for replacing the filter cores.

To reduce the frequency of changing or cleaning the filter or to reduce the filter's airflow resistance, the filter media can be provided with a large surface area. However, this may lead to an oversized filter frame, which can be expensive and can be difficult to install in areas of limited space. So, the filter media is often pleated or corrugated to increase its surface area without increasing the overall size of the filter frame.

Typical examples of filters with a corrugated filter media are disclosed in U.S. Pat. Nos. 1,982,639; 2,393,419; 2,739,667 and 3,246,456. The '639 patent discloses a filter media that is fed from one storage roller onto another as a series of staggered rollers guides a dust-collecting portion of the media in a zigzag pattern across the main air passage. It appears that each roller alone has enough capacity to store the entire filter media. This is apparently so that one roller can hold a complete roll of clean media, and later, the other roller can collect the entire roll after the media has passed across the air passage. Consequently, the filter assembly is quite bulky, as its total storage area is at least twice the volume of the filter media.

A common drawback of current filters is that they are usually of fixed predetermined sizes to fit specific filter frames, filter casings or air passageways. This creates a problem for filter manufacturers and dealers, as they may need to carry a large inventory of filters to match the numerous models of HVAC equipment. Such an inventory may require a significant amount storage space, as there are tendencies or advantages of making filters large to reduce the frequency at which they need to be changed and to reduce the filter's airflow resistance, as already explained.

SUMMARY OF THE INVENTION

To overcome the drawbacks of current air filters, it is an object of the invention to provide a corrugated filter media that can be used in various sized filter frames. Another object of the invention is to enable parts dealers to reduce their inventory of filters and to allow the dealers to supply the right filter media without having to know an exact size of a particular piece of HVAC equipment.

Another object of the invention is to provide a filter frame with integral living hinges that enable a relatively flat frame to fold into a more box-like shape.

Another object is to provide a filter media with side panels that connect to a filter frame, such that together the filter media and filter frame comprise a box-like structure.

Another object is to provide a filter frame with a storage chamber for storing unused pleats of a corrugated filter media.

Yet, another object is to provide a filter frame that includes a pivotal saw tooth rack for supporting a corrugated filter media.

A further object is to provide a filter frame with a channel that helps support a side panel of a filter media.

A still further object is to provide a filter core that once installed in a filter casing is substantially stationary to avoid the maintenance that is often associated with moving parts.

Another object is to provide a filter frame with a tie rod that helps hold a pivotal saw tooth rack in its proper position.

Another object is to have a living hinge couple the tie rod to filter frame.

These and other objects of the invention are provided by a filter assembly that includes a corrugated filter media, wherein some pleats of the media are disposed in a main airflow passageway, and other pleats are folded more compactly and stored further away from the main flow of air.

BRIEF DESCRIPTION OF THE DRAWINGS

FIG. 6 is a perspective view similar to FIG. 3, but with the filter media omitted to more clearly show features of the filter frame.

DESCRIPTION OF THE PREFERRED EMBODIMENT

Figure 1:
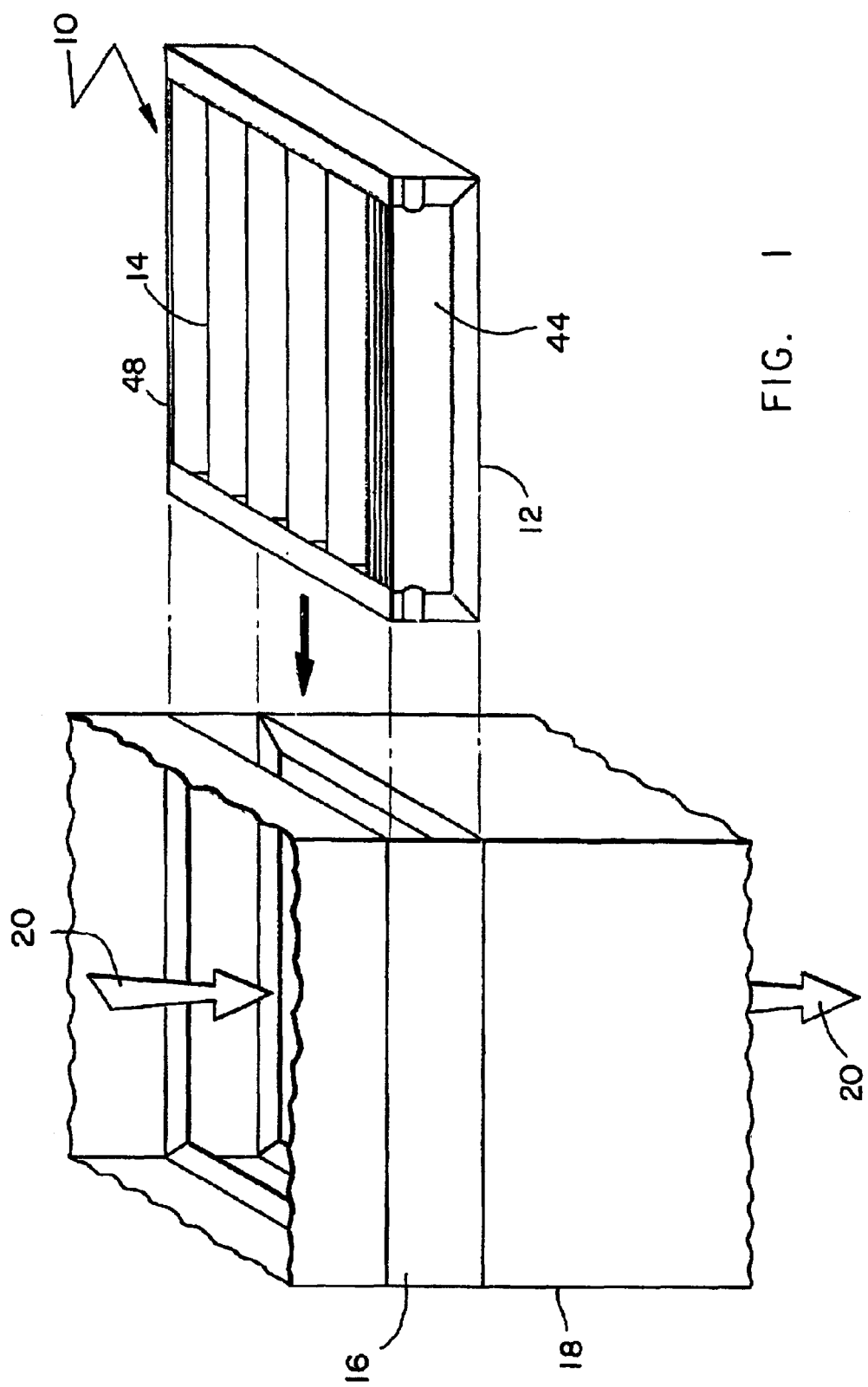
FIG. 1 is a perspective view showing a filter core (according to one embodiment of the invention) being inserted into a filter casing.
Figure 2:
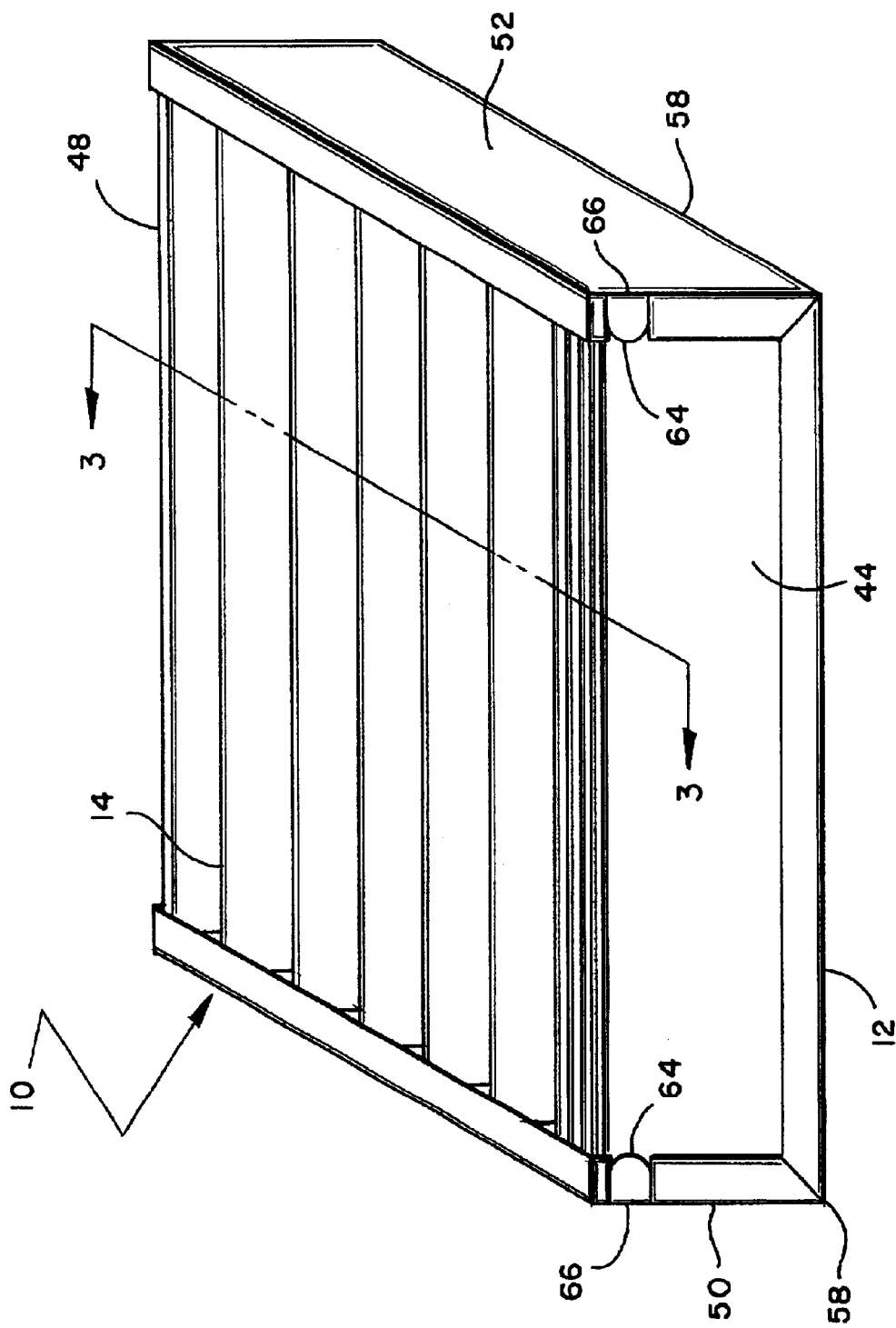
FIG. 2 is a perspective view of the filter core shown in FIG. 1.

Referring to FIGS. 1 and 2, a filter core 10 comprises a plastic frame 12 containing an air permeable filter media 14. Core 10 is adapted to be removably inserted in a filter casing 16, which is installed inside an air duct 18 or some other piece of HVAC equipment, such as a furnace, air conditioner, heat pump, air handler, etc. When placed inside casing 16, core 10 lies across the main air passage in duct 18. As air 20 travels through duct 18 and core 10, media 14 filters dust and other particles from the air.

Figure 3:
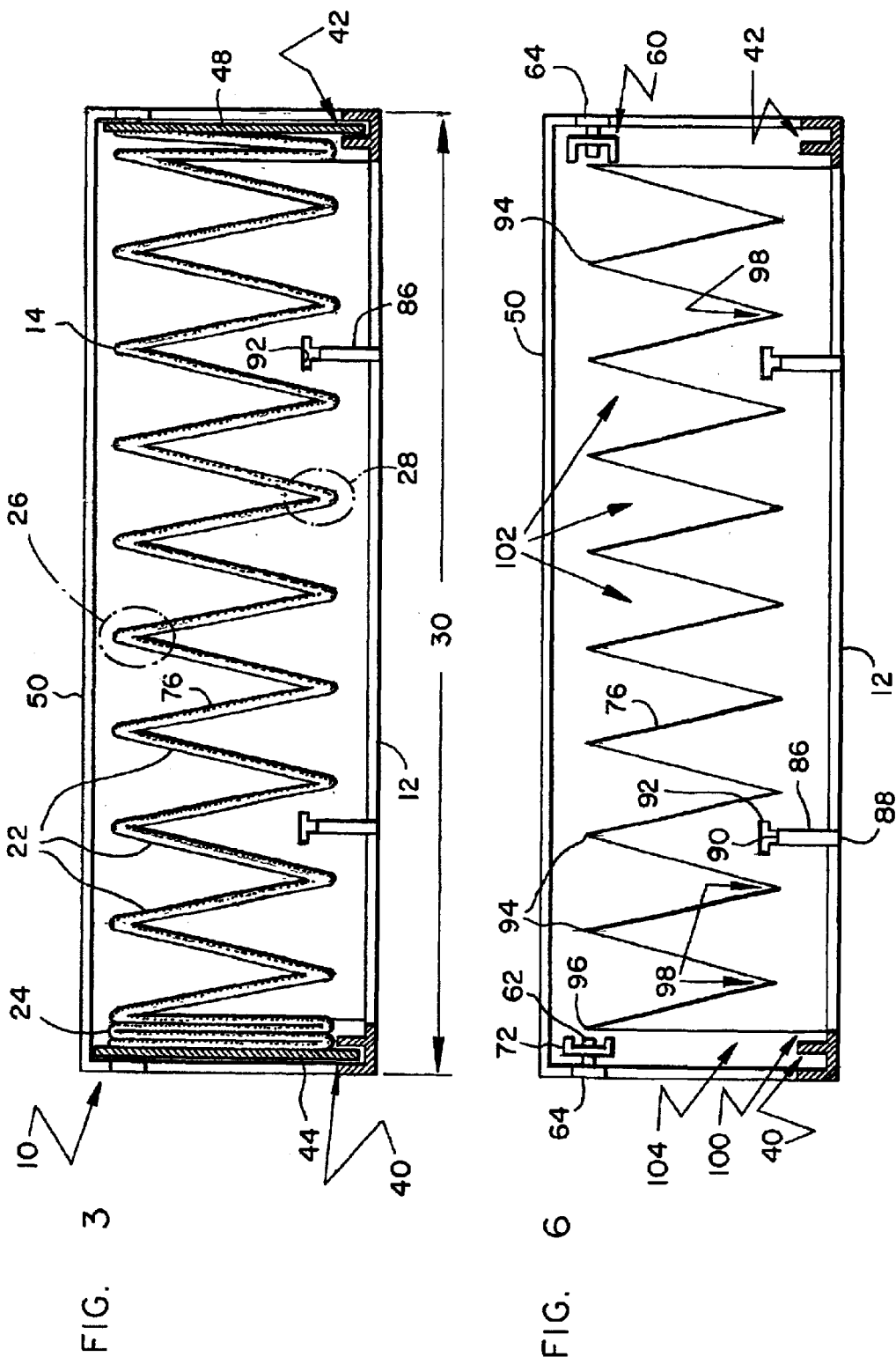
FIG. 3 is a cross-sectional view taken along line 3—3 of FIG. 2.

Referring to FIG. 3, a cross-sectional view of core 10 shows media 14 being corrugated to create a first plurality of pleats 22 and an adjoining second plurality of pleats 24. The term, "pleat" refers to a section of sheet material having a crease, fold or bend. For example, section 26 is one pleat, and section 28 is another pleat. Pleats 22 are loosely folded to provide an open broad area of media for filtering air 20. For this particular size of filter core, pleats 24 are surplus and are not needed for filtering air, so pleats 24 are compactly folded and stored off to one side of frame 12.

The extra pleats 24 provide the option of expanding media 14 to fill wider frames (i.e., wider as measured along dimension 30). This expandability feature allows a manufacturer or parts dealer to keep a relatively small assortment of filter media, and yet still be able to fill the needs of customers having a wide variety of filter frame sizes. When separated from its frame, media 14 can be tightly folded to create a rather compact item that can be readily stored or shipped.

Figure 4:
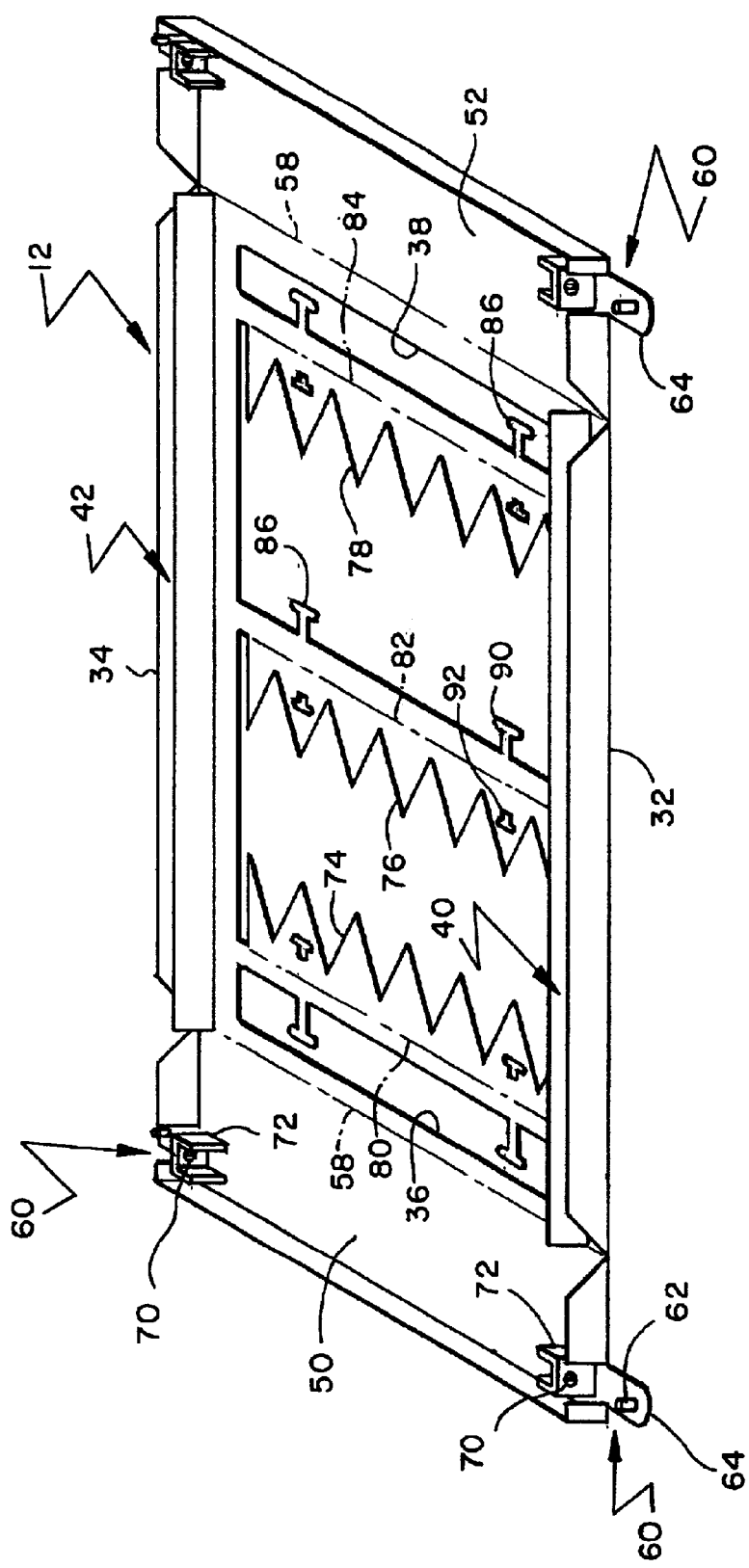
FIG. 4 is a perspective view of a filter frame used in the filter core of FIG. 2.
Figure 5:
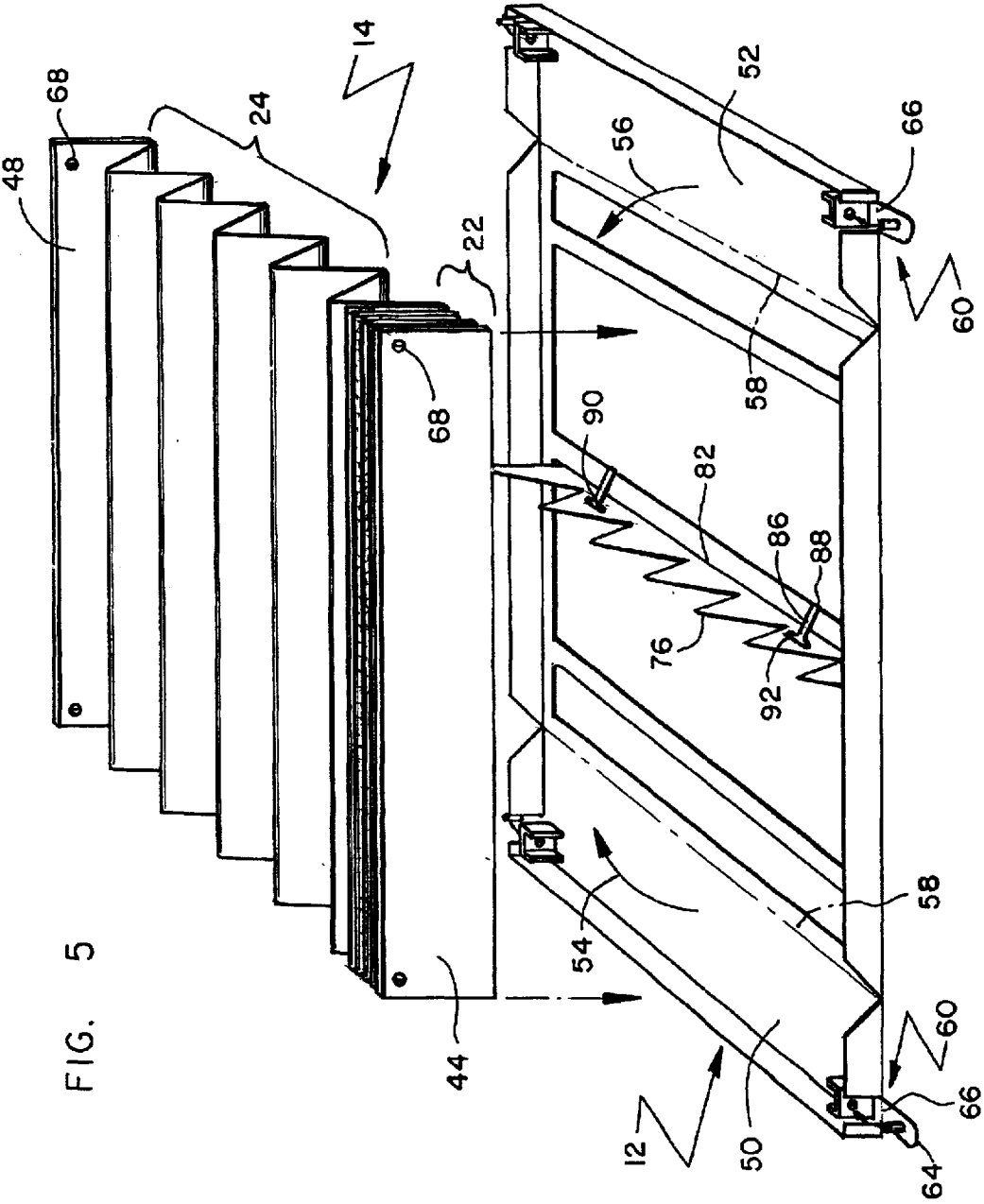
FIG. 5 is a perspective view showing a filter media and a filter frame being assembled into the filter core of FIG. 2.

Referring to FIGS. 4 and 5, frame 12 includes features that not only allow the replacement of media 14, but also facilitate manufacturing frame 12 as a unitary plastic injection molded part. Frame 12 includes a first pair of frame members 32 and 34 and a second pair of frame members 36 and 38. The four frame members lie in a generally rectangular configuration.

Frame members 32 and 34 include channels 40 and 42, which are able to receive two side panels 44 and 48 of media 14, thereby helping to hold media 14 in place. In some embodiments of the invention, side panels 44 and 48 are made of cardboard and are preferably more rigid than the air permeable portion of media 14.

To secure the ends of media 14, frame 12 includes two end plates 50 and 52 that can flip upright, as indicated by arrows 54 and 56 of FIG. 5. End plates 50 and 52 each pivot about one or a linear series of living hinges 58 that integrally join end plates 50 and 52 to frame 12. The term, "living hinge," refers to a flexible member that is an integral extension of two pivotal pieces, whereby the flexible member and the two pivotal pieces comprise a unitary piece. Living hinges are commonly produced by a plastic injection molded process where the hinge and the two pivotal pieces come from the same mold.

To hold end plates 50 and 52 in their upright positions, each end plate 50 and 52 includes two latches 60 with protrusions 62 that hook into holes 68 in side panels 44 and 48. Protrusions 62 extend from tabs 64 that are pivotally joined to end plates 50 and 52 by way of a living hinge 66. As tabs 64 pivot to insert protrusions 62 into holes 68, protrusions 62 also extend into holes 70 of catch members 72. Thus, side panels 44 and 48 are held in place between tabs 64 and catch members 72.

Frame 12 also includes one or more flip-up saw tooth racks 74, 76 and 78. The term, "saw tooth," is used in a broad sense to encompass any shape able to help support a corrugated media and does not necessary mean a shape resembling the teeth of a saw blade. When pivoted upward from their laid down position of FIG. 4 to their upright position of FIG. 5, racks 74, 76 and 78 are able to support the corrugated portion of media 14. Living hinges 80, 82 and 84 enable the racks to pivot relative to frame 12. To help hold racks 74, 76 and 78 at their upright positions, frame 12 is provided with tie rods 86. Tie rods 86 have one end pivotally connected to frame 12 by way of a living hinge 88 and an opposite end 90 that hooks into an opening 92 in the saw tooth racks.

Once in their upright positions, as shown in FIG. 6, peaks 94 and 96 and valleys 98 and 100 of racks 74, 76 and 78 help define a plurality of chambers 102 and a storage chamber 104. Chambers 102 and 104 help hold pleats 22 and 24 substantially stationary, i.e., media 14 does not travel across frame 12 during normal use of filter core 10. Chambers 102 are for pleats 22 and storage chamber 104 is for pleats 24, as shown in FIGS. 3 and 6. It should be noted that actually any of chambers 102 could serve as a storage chamber for storing excess pleats 24; however, pleats 24 are preferably stored where they provide minimal resistance to airflow.

Folding media 14 and attaching side panels 44 and 48 can be carried out in any conventional manner well known to those skilled in the art. Also, the plastic injection molding of frame 12 in its configuration shown in FIG. 4 is also a process well known to those skilled in the art.

To assemble filter core 10, first, racks 74, 76 and 78 and tie rods 86 are pivoted toward each other to engage tie rod ends 90 with the racks by inserting ends 90 into openings 92, as shown in FIG. 5. Next, pleats 22 and 24 of media 14 are placed into their respective chambers of the racks, and side panels 44 and 48 are inserted into channels 40 and 42, as shown in FIGS. 3 and 5. End plates 50 and 52 are then pivoted adjacent to or against the ends of media 14. To hold end plates 50 and 52 in this position and to hold side panels 44 and 48 in place, protrusions 62 are inserted through holes 68 and holes 70. This completes the assembly of filter core 10, as shown in FIG. 2. Core 10 is now ready to be inserted into filter casing 16, as shown in FIG. 1.

Although the invention is described with reference to a preferred embodiment, it should be appreciated by those skilled in the art that other variations are well within the scope of the invention. Therefore, the scope of the invention is to be determined by reference to the claims, which follow.

I claim:

1. A filter assembly, comprising:
   a core at least partially defining a plurality of chambers and a storage chamber, wherein the plurality of chambers are adjacent the storage chamber; and
   a filter media having a first plurality of pleats and a second plurality of pleats, wherein the first plurality of pleats adjoin the second plurality of pleats, the first plurality of pleats are distributed over the plurality of chambers, and the second plurality of pleats are more compactly stored in the storage chamber.

2. The filter assembly of claim 1, wherein the core includes a saw tooth rack having a plurality of peaks and valleys, which define the plurality of chambers.

3. A filter assembly, comprising:
   a core at least partially defining a plurality of chambers and a storage chamber, wherein the plurality of chambers are adjacent the storage chamber;
   a filter media having a first plurality of pleats and a second plurality of pleats, wherein the first plurality of pleats adjoin the second plurality of pleats, the first plurality of pleats are distributed over the plurality of chambers, and the second plurality of pleats are more compactly stored in the storage chamber; and
   wherein the core includes a generally rectangular frame comprising a first pair of frame members that are substantially parallel to each other and a second pair of frame members that are substantially perpendicular to the first pair of frame members, wherein the saw tooth rack is pivotally coupled to the frame.

4. The filter assembly of claim 3, further comprising a living hinge that couples the saw tooth rack to frame.

5. The filter assembly of claim 1, wherein the core includes a generally rectangular frame comprising a first pair of frame members that are substantially parallel to each other and a second pair of frame members that are substantially perpendicular to the first pair of frame members, wherein a first end plate is pivotally connected to one frame member of the first pair of frame members and a second end plate is pivotally connected to another frame member of the first pair of frame members.

6. The filter assembly of claim 5, further comprising a living hinge that pivotally couples the first end plate and the second end plate to the generally rectangular frame, whereby the first end plate, the second end plate, and the frame comprise a unitary piece.

7. The filter assembly of claim 5, further comprising a side panel attached to the filter media and being adjacent the second pair of frame members, wherein the side panel defines a hole adapted to receive a protrusion extending from the first end plate.

8. The filter assembly of claim 7, wherein the protrusion is pivotal relative to the first end plate.

9. The filter assembly of claim 3, further comprising a side panel attached to the filter media, wherein the second pair of frame members defines a channel into which the side panel of the filter media is disposed.

10. The filter assembly of claim 1, wherein the first plurality of pleats and the second plurality of pleats are held substantially stationary.

11. The filter assembly of claim 1, wherein the first plurality of pleats are substantially equally distributed over the plurality of chambers.

12. The filter assembly of claim 4, further comprising a tie rod connected to the frame and being selectively engaged and disengaged from the saw tooth rack.

13. The filter assembly of claim 12, wherein the tie rod is pivotally relative to the frame.

14. The filter assembly of claim 13, further comprising a second living hinge that connects the tie rod to the frame.

15. A filter assembly, comprising:
a core that includes a generally rectangular frame that defines an airflow opening therethrough, the core further includes a saw tooth rack having a plurality of peaks and valleys which at least partially define a plurality of chambers and a storage chamber, wherein the storage chamber is adjacent the plurality of chambers; and
a filter media having a first plurality of pleats and a second plurality of pleats, wherein the first plurality of pleats adjoin the second plurality of pleats, the first plurality of pleats extend across the airflow opening and are distributed over the plurality of chambers, and the second plurality of pleats are stored in the storage chamber adjacent the airflow opening.

16. A filter assembly, comprising:
a core that includes a generally rectangular frame that defines an airflow opening therethrough, the core further includes a saw tooth rack having a plurality of peaks and valleys which at least partially define a plurality of chambers and a storage chamber, wherein the storage chamber is adjacent the plurality of chambers;
a filter media having a first plurality of pleats and a second plurality of pleats, wherein the first plurality of pleats adjoin the second plurality of pleats, the first plurality of pleats extend across the airflow opening and are distributed over the plurality of chambers, and the second plurality of pleats are stored in the storage chamber adjacent the airflow opening; and
wherein the saw tooth rack is pivotally coupled to the frame.

17. The filter assembly of claim 16, further comprising a living hinge that couples the saw tooth rack to frame.

18. The filter assembly of claim 15, wherein the generally rectangular frame comprises a first pair of frame members that are substantially parallel to each other and a second pair of frame members that are substantially perpendicular to the first pair of frame members, wherein a first end plate is pivotally connected to one frame member of the first pair of frame members and a second end plate is pivotally connected to another frame member of the first pair of frame members.

19. The filter assembly of claim 18, wherein the generally rectangular frame, the first end plate, and the second end plate are integrally joined to comprise a unitary piece.

20. The filter assembly of claim 18, further comprising a side panel attached to the filter media and being adjacent the second pair of frame members, wherein the side panel defines a hole adapted to receive a protrusion extending from the first end plate.

21. The filter assembly of claim 20, wherein the protrusion is pivotal relative to the first end plate.

22. The filter assembly of claim 18, further comprising a side panel attached to the filter media, wherein the second pair of frame members defines a channel into which the side panel of the filter media is disposed.

23. The filter assembly of claim 15, wherein the saw tooth rack is one of a plurality of saw tooth racks.

24. The filter assembly of claim 15, wherein the first plurality of pleats and the second plurality of pleats are held substantially stationary.

25. The filter assembly of claim 16, further comprising a tie rod connected to the frame and being selectively engaged and disengaged from the saw tooth rack.

26. The filter assembly of claim 25, wherein the tie rod is pivotally relative to the frame.

27. The filter assembly of claim 26, further comprising a second living hinge that connects the tie rod to the frame.

28. A method of inserting a filter media into a core having a plurality of chambers and a storage chamber, the method comprising:
folding the filter media to create a first plurality of pleats and a second plurality of pleats;
inserting the first plurality of pleats in the plurality of chambers; and
inserting the second plurality of pleats in the storage chamber, wherein the second plurality of pleats are more tightly folded than the first plurality of pleats.

29. The method of claim 28, wherein the core includes a generally rectangular frame to which an end plate is pivotally attached, and further comprising pivoting the end plate into engagement with the filter media.

30. The method of claim 29, wherein a latch is pivotally joined to the end plate, and further comprising pivoting the latch into engagement with the filter media.

31. The method of claim 28, wherein the filter media comprises a pleated air permeable material joined to a side panel, wherein the side panel is more rigid than the pleated air permeable material.

32. The method of claim 31, further comprising inserting the side panel into a channel defined by the core.

33. The method of claim 28, wherein the core includes a saw tooth rack that helps define the plurality of chambers.

34. A method of inserting a filter media into a core having a plurality of chambers and a storage chamber, the method comprising:
folding the filter media to create a first plurality of pleats and a second plurality of pleats;

inserting the first plurality of pleats in the plurality of chambers;

inserting the second plurality of pleats in the storage chamber, wherein the second plurality of pleats are more tightly folded than the first plurality of pleats;

wherein the core includes a generally rectangular frame to which an end plate is pivotally attached, and further comprising pivoting the end plate into engagement with the filter media; and wherein the core includes a saw tooth rack that helps define the plurality of chambers, and further comprising pivoting the saw tooth rack relative to the frame.

35. The method of claim 28, further comprising holding the first plurality of pleats and the second plurality of pleats substantially stationary.

* * * * *

UNITED STATES PATENT AND TRADEMARK OFFICE
CERTIFICATE OF CORRECTION

PATENT NO.    : 6,723,150 B2
DATED         : April 20, 2004
INVENTOR(S)   : Nathan P. Parker It is certified that error appears in the above-identified patent and that said Letters Patent is hereby corrected as shown below:

<u>Title page,</u>
Item [57], ABSTRACT,
Line 1, "comprises" should read -- includes --.

Signed and Sealed this

Seventh Day of December, 2004

JON W. DUDAS
*Director of the United States Patent and Trademark Office*